3,708,290
INORGANIC PHOTOCONDUCTIVE PIGMENTS IN AN ALKALI SOLUBLE BINDER CONTAINING A POLYMERIC DISPERSING AGENT
Karel Eugeen Verhille, Pansgatelaan 42, Mortsel, Belgium, and Luciaan Frans Voet, Lierse Steenweg 20, St. Katelijne-Waver, Belgium
No Drawing. Continuation-in-part of application Ser. No. 665,219, Sept. 5, 1967. This application Mar. 23, 1971, Ser. No. 127,393
Claims priority, application Great Britain, Sept. 5, 1966, 39,636/66
Int. Cl. G03g 5/08
U.S. Cl. 96—1.5                 4 Claims

ABSTRACT OF THE DISCLOSURE

A recording material including an electrically conductive support carrying a coating comprising:
(1) 60–95% by dry weight of a finely divided inorganic pigmentary material having photoconductive properties and selected from basic or amphoteric oxides and metal sulphides derived from metals forming basic or amphoteric oxides,
(2) a normally electrically insulating alkali-soluble binder in an effective binding amount, and
(3) a water-soluble polymeric dispersing agent differing in chemical structure from the binder present in said coating in a ratio by weight of about 0.1 to 1.5% by weight of pigmentary material. The dispersing agent is either (a) a copolymer with some recurring units thereof derived from a polymerzable unsaturated monocarboxylic acid, its anhydride or a salt thereof, and other recurring units derived from a polymerizable unsaturated compound containing an amino group, a carbalkoxy group, a carbamyl group, an N-pyrrolidone group or an ether group, or (b) copolymer having some recurring units thereof derived from a polymerizable unsaturated dicarboxylic acid, its anhydride or salt thereof, and other recurring units derived from a polymerizable unsaturated compound containing an ester group, an amino group, a carbalkoxy group, a carbamyl group, an N-pyrrolidone group or an ether group.

---

The present application is a continuation-in-part of the patent application No. 665,219 filed Sept. 5, 1967, now abandoned.

The present invention relates to a method of preparing an electrophotographic material and to an electrophotographic material containing inorganic photoconductive pigmentary material dispersed in an insulating binder by means of a dispersing agent.

It is generally known that in the production of electrophotographic materials containing a photoconductive pigment coating the fineness of the pigment grains and a good dispersion thereof is a factor determining the quality of the photographic images obtained therewith. The fineness of pigment grains does not only contribute to the covering power, but also controls opacity and the smoothness of the coating.

It is difficult to provide a substantially homogeneous suspension of inorganic photoconductive pigment particles in an aqueous medium due to the tendency of the particles to aggregate, the formation of aggregates of particles resulting in a rapid settling to form a voluminous or clay-like sediment. In order to remedy for this aggregation deflocculating agents are used which can be considered as strong dispersing agents. Deflocculation will produce the inorganic photoconductive pigments in colloidal condition and so control their particle size. By "deflocculation" is meant a process of chemico-physical disaggregation of coarse aggregates into particles of colloidal dimension.

The object of the present invention is to provide a method of preparing suspensions of inorganic photoconductive pigments in an aqueous medium, which suspensions have a poor tendency to aggregate formation.

It is another object of the present invention is provide stabilized aqueous dispersions of inorganic photoconductive pigments e.g. in the form of a latex paint.

It is still another object of the present invention to provide improved coatings on the basis of inorganic photoconductive pigments and a binder applied from an aqueous medium.

It is a particular object of the present invention to provide improved electrophotographic materials comprising a support and a photoconductive recording layer, which contains a binder, a dispersed inorganic photoconductive pigment, and a dispersing agent for said pigment, which dispersing agent does not markedly reduce the chargeability of the recording layer and even increases its photosensitivity.

The method of preparing an electrophotographic recording material according to the present invention comprises the steps of admixing finely divided inorganic photoconductive pigment material of the class consisting of metal oxides with basic or amphoteric character and metal sulfides of metals forming basic or amphoteric oxides in an aqueous medium and a normally electrically insulating alkali-soluble binder in an aqueous alkaline medium in the presence of a water-soluble dispersing agent differing in chemical structure from the binder and selected from the group of copolymers having a part of the recurring units thereof derived from a polymerizable unsaturated monocarboxylic acid, its anhydride or a salt thereof, and another part of said recurring units derived from a polymerizable unsaturated compound containing an amino group including a substituted amino group, e.g. a dialkylamino group, a carbalkoxy group, including a substituted carbalkoxy group, e.g. diethylamino substituted, a cabamyl group, an N-pyrrolidone group or an ether group, e.g. methoxy or ethoxy, and copolymers having a part of the recurring units thereof derived from a polymerizable unsaturated dicarboxylic acid, its anhydride or salt thereof, such as a water-soluble metal or onium salt, e.g. sodium, potassium, ammonium, sulphonium or phosphonium salt, and another part of said recurring units derived from a polymerizable unsaturated compound containing an amino group including a substituted amino group, e.g. a dialkylamino group, a carbalkoxy group, including a substituted carbalkoxy group, e.g. a dialkylamino-substituted carbalkoxy group, a carbamyl group, an N-pyrrolidone group, an ether group, e.g. a $C_1$–$C_5$ alkoxy group, preferably a methoxy or ethoxy group or an ester group, e.g. an acetate ester group; applying said admixture as a coating on an electrically conductive support and drying said coating, the amount of said pigment material being sufficient to constitute about 60–95% by weight of the solids content of the dried coating, the amount of said dispersing agent constituting about 0.1–1.5% by weight of the pigment material, and the amount of said binder being sufficient to bind said pigment to said support.

Preferably copolymers of $\alpha,\beta$-ethylenically unsaturated compounds are used having recurring units containing at least one electronegative carboxylic acid group in free state, salt or anhydride form and recurring units comprising a carbamyl group or amino group, wherein the latter group is preferably alkyl-substituted. The carbamyl group also called amide group can be substituted to make part of a ring structure (as —NHCO—) as is the case, e.g., in a pyrrolidone nucleus.

In the recording material the amount of said dispersing agent constitutes about 0.1–1.5% by weight of the pigment material and the ratio of said recurring units containing a polymerizable unsaturated mono- or dicarboxylic acid, its anhydride or a salt thereof with respect to the other monomers forming the copolymers is preferably in the range of 1:5–7:3 on a molar basis.

The molecular weight of the copolymers used according to the present invention which may vary within broad limits has no marked influence in the dispersing capacity; preferably their molecular weight is at least 1000 and may be as high as 300,000. The more preferred range is, however, from 5,000 to 80,000.

The copolymers used according to the present invention can be prepared in a way known for the polymerization of α,β-ethylenically unsaturated compounds, e.g. as described by W. R. Sorensen and T. W. Campbell in "Preparative Methods of Polymer Chemistry"—Interscience Publishers Inc., New York (1961). According to a well established method, the mixture of monomers, preferably dissolved in an inert solvent, is polymerized under the influence of free radical-forming agents, which can be formed in a photo-chemical, thermal or other physical or chemical way. After their preparation, the copolymers are purified as usual by precipitating them in a non-solvent, whereafter they are separated by filtration, washed and dried.

Copolymers which have been found to be particularly suited for application according to the present invention are listed hereinafter in Table 1.

TABLE 1

(1)

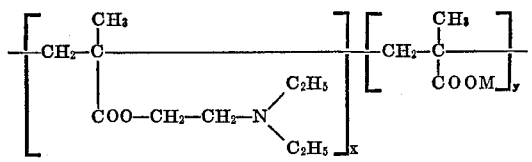

$x = 30$ mole percent
$y = 70$ mole percent
M = a cation, e.g. hydrogen ion, metal cation or onium group (2)

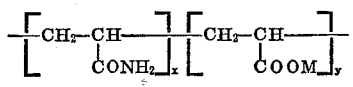

$x = 80$ mole percent
$y = 20$ mole percent
M = a cation, e.g. a hydrogen ion, metal cation or onium group (3)

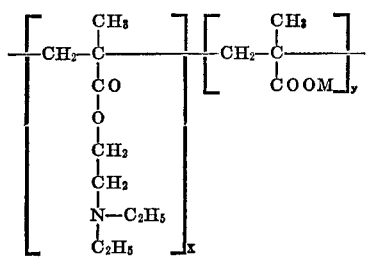

$x = 52$ mole percent
$y = 48$ mole percent
M = a cation, e.g. a hydrogen ion, metal cation or onium group (4)

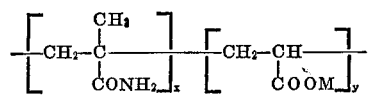

$x = 56$ mole percent
$y = 44$ mole percent
M = a cation, e.g. a hydrogen ion, metal cation or onium group (5)

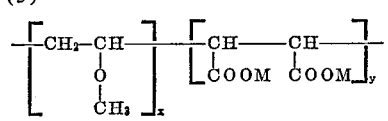

(type a, b and c)

$x = 50$ mole percent
$y = 50$ mole percent
M = a cation, e.g. a hydrogen ion, metal cation or onium group Viscosity of a 1% aqueous solution at 20° C.

|  | Cps. |
|---|---|
| Low (a) | 2 |
| Medium (b) | 4.4 |
| High (c) | 11.2 |

(6)

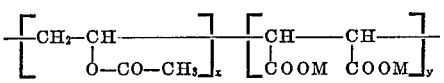

$x = 50$ mole percent
$y = 50$ mole percent
M = a cation, e.g. hydrogen ion, metal cation or onium group (7)

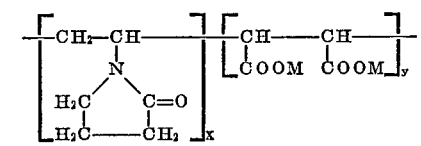

$x = 60$ mole percent
$y = 40$ mole percent
M = a cation, e.g. hydrogen ion, metal cation or onium group It is self-explanatory that mixtures of dispersing agents can be applied.

By an "aqueous medium" is meant water or a liquid composition containing sufficient water to dissolve the dispersing agent. Suitable aqueous media may contain water-miscible solvents such as ethanol or acetone. In this respect aqueous media containing from 150–50 parts by volume of ethanol to 50–150 parts by volume of water, or 50 parts by volume of water, 35 parts by volume of ethanol and 15 parts by volume of acetone are mentioned.

For preparing photoconductive zinc oxide dispersions in aqueous medium suited for application in the manufacture of electrophotographic recording layers 0.1 to 1.5% by weight of the said dispersing agent in respect of the zinc oxide is preferably used. In general, it has been observed that an increase of dispersing agent beyond a critical value, in most cases near 1.5% by weight in respect of the photoconductive pigment, is effecting a decrease in sensitivity and chargeability of the recording layer.

In comparison with known dispersing agents for zinc oxide, such as lignine sulphonates and polyphosphates, e.g., sodium hexametaphosphate, the above mentioned dispersing agents are more suited for use in the preparation of photoconductive recording layers which have to be charged electrostatically. Indeed, said dispersing agents enhance the sensitivity of the recording material and up to 1.5% by weight in respect of the photoconductive pigment do not markedly reduce the chargeability. This is elucidated in the example given hereinafter.

Copolymers which on their addition to the aqueous medium do not contain carboxylic acid anions but groups from which such anions can be formed by hydrolysis are used in an aqueous medium with a pH higher than 7, preferably 7–11. Thus e.g. copolymers of maleic anhydride are treated with sufficient base such as an alkali hydroxide, an alkali carbonate, an alkali bicarbonate or an ammonium hydroxide, or a sufficiently strong organic and preferably volatile base.

In the preparation of electrophotographic recording layers preferably a volatile nitrogen base is used in combination with the dispersing agent to have therein a cation derived from a basic volatile nitrogen compound. Such bases are e.g. ammonia, an aliphatic amine, e.g. ethylamine, butylamine, hexylamine, or a heterocyclic amine such as morpholine and pyridine. The use of such base appears necessary for obtaining a good chargeability. Taking into consideration the cost price, ammonia is the preferred volatile alkali. By volatile bases are understood those bases having a boiling point below 150° C. at normal pressure so that they can be removed by drying, if necessary by heating the coated recording layer.

The dispersing copolymers described in the present invention are particularly suitable for the dispersion of photoconductive metal oxides with basic or amphoteric character, such as photoconductive zinc oxide, titanium (IV) oxide, lead oxides, mercury(I) and mercury(II) oxide. Further are considered the photoconductive sulphides of metals which form basic or amphoteric oxides, such as photoconductive cadmium sulphide and zinc sulphide.

The binding agents used in combination with the above dispersing agents are selected depending on the use of the pigment coating. As water-soluble binders hydrophilic colloids can be used, e.g., one or a mixture of them mentioned in the United Kingdom patent specification 1,099,416, e.g. gelatin, glue, casein, zein, hydroxyethylcellulose, carboxymethylcellulose, methylcellulose, carboxymethylhydroxyethylcelluose, gum arabic, sodium alginate, polyvinyl alcohol, poly-N-vinylpyrrolidone, polyethylene oxide, polystyrene sulphonic acid, polyacrylic acid and hydrophilic derivatives of said natural, natural modified or synthetic polymers. The hydrophilic binders can be used in combination with polymers in latex form. However, a latex polymer alone can serve as a suitable binder for a pigment coating. Latex polymers, e.g., polyethyl acrylate forming a closed layer on drying are of the weak type, which means that the polymer particles soften below 20° C. Latex polymers of the hard type, the polymer particles of which soften above 20° C., are preferably used in combination witha water-soluble binder. Polymers of the hard type are described in the United States patent specification 3,476,937. Latices suitable for use in combination with hydrophilic binders are described in United Kingdom patent specification 1,052,692.

For the preparation of electrophotographic layers comprising photoconductive zinc oxide dispersed according to the present invention are preferably used alkali-soluble binding agents, such as those described in the United Kingdom patent specifications 881,613, 1,125,580 and 1,125,579.

A photoconductive coating applied from the dispersion of photoconductive oxides and/or sulphides contains sufficient binding agent to obtain the desired mechanical strength. Preferably, the coating mixture contains dispersed photoconductive pigment e.g. photoconductive zinc oxide in a weight ratio of 95% to 60% in respect of the total solid content of the coated and dried layer.

The viscosity given in the examples has been measured at 25° C. and is expressed in cps. All viscosity values have been obtained at a shear rate of 500 sec.$^{-1}$.

The dispersing agents used in the present invention may be applied for the preparation of electrophotographic recording layers whereon an electrostatic image is obtained without precharging by simple exposure to electromagnetic radiation, to which the layer is sensitive. Suitable aqueous coating compositions for preparing such layers are described in the United Kingdom patent application 1,156,822.

Photoconductive layers can be applied by the dip-coating system to support commonly known to those skilled in the art. For the preparation of photoconductive zinc oxide recording materials paper supports are preferred, e.g., paper supports of the glassine paper type.

The following examples illustrate the present invention.

EXAMPLE 1

To a solution of 2 g. of poly(vinyl acetate/crotonic acid) (94.4/5.6) in 50 ccs. of water and 1 cc. concentrated ammonium hydroxide of technical grade were successively added:

1.37 g. of a 73% aqueous solution of a melamine resin marketed by British Resin Products under the trade name "Epok W–9801,"
20 g. of zinc oxide, type Blanc de Zinc Neige A, marketed by Vieille Montagne, Belgium,
0.10 g. of each of the polymers listed in Table 2 hereinafter and taken separately,
0.82 cc. of a 10% solution of acid butyl phosphate in ethanol.

The resulting mixture was ground for 2 hours in a ball mill, whereafter the viscosity of the coating mixture was measured and the solution applied to an aluminium-coated paper. The coating was dried for 15 minutes at 100° C. and stored in the dark for 24 hours. The electrostatic charging was performed with a negative corona of 6000 volts, and the exposure carried out through a step wedge with constant 0.1 by means of light bulbs of a total energy of 450 w./100 v. illuminating the material with 2400 lux. The development was carried out by means of an electrophoretic developer containing positively charged toner particles in an insulating hydrocarbon liquid. In the obtained print the number of the non-developed steps is directly proportional to the light-sensitivity of the recording material. This number is mentioned in Table 2, hereinafter in the column of the sensitivity.

TABLE 2

| Polymer of Table 1 | Grams of zinc oxide per sq. m. | Sensitivity | Maximum charge (volt) | Viscosity (cps.) |
| --- | --- | --- | --- | --- |
|  | 29.7 | 2 | 310 | (1) |
| 1 | 25.4 | 10 | 360 | 5.9 |
| 2 | 26.3 | 10 | 420 | 10.5 |
| 3 | 19 | 9 | 308 | 4.7 |
| 4 | 34 | 12 | 400 | 3.7 |
| 5(a) | 14 | 8 | 225 | 3.3 |
| 5(b) | 20.2 | 9 | 259 | 4.2 |
| 5(c) | 14 | 8 | 185 | 3.7 |
| 6 | 25 | 8 | 320 | 4.5 |
| 7 | 23 | 10 | 259 | 3.53 |

[1] Too high for being measured.

EXAMPLE 2

To a solution of 3 g. of poly(vinyl acetate/crotonic acid) (94.4/5.6) in 50 ccs. of water and 1 cc. of concentrated ammonium hydroxide of technical grade were added 20 g. of zinc oxide, type Blanc de Zinc Neige A, marketed by Vieille Montagne, Belgium, 0.10 g. of each of the polymers listed in Table 3 hereinafter and taken separately, and 0.82 cc. of a 10% solution of acid butyl phosphate in ethanol. The resulting mixture was ground for 2 hours in a ball mill, whereafter the solution was coated, dried, stored, charged and developed in a manner quite similar to that described in Example 1.

TABLE 3

| Polymer of Table 1 | Grams of zinc oxide per sq. m. | Sensitivity | Viscosity (cps.) |
|---|---|---|---|
|  | 32.50 | 5 | (¹) |
| 1 | 33.45 | 9 | 5.55 |
| 2 | 27.20 | 7 | 7.65 |
| 3 | 30.10 | 8 | 3.76 |
| 4 | 32.45 | 9 | 3.18 |
| 5(a) | 15.88 | 9 | 3.07 |
| 5(b) | 16.02 | 9 | 4.11 |
| 5(c) | 15.20 | 9 | 3.30 |
| 6 | 35 | 9 | 4.23 |
| 7 | 28.74 | 6 | 3.53 |

¹ Too high for being measured.

EXAMPLE 3

To 20 g. of zinc oxide, type Blanc de Zinc Neige A, marketed by Vieille Montagne, Belgium, was added a solution of A g. of poly(vinyl acetate/crotonic acid) (94.4/5.6) in 50 ccs. of water and 1 cc. of concentrated ammonium hydroxide (technical grade), and B g. of copoly(vinyl methyl ether/maleic anhydride) (50/50) marketed by General Aniline, U.S.A. under the trade name Gantrez AN 119, referred to in Table 4 as polymer II. Hereafter were added successively the ingredients mentioned in Table 4, as well as 1.37 g. of a melamine resin marketed by British Resin Products as a 73% aqueous solution under the trade name "Epok W–69801," referred to in Table 4 hereinafter as polymer I. Coating, charging, exposure and development of the respective materials are carried out as described in Example 1.

TABLE 4

| Polymer I A grams | Polymer II B grams | Sensitivity | Viscosity (cps.) |
|---|---|---|---|
| 3 | 0.00 | 0 | (¹) |
| 3 | 0.05 | 8 | 3.64 |
| 2.9 | 0.1 | 10 | 4.23 |
| 2.5 | 0.5 | 10 | 9.9 |
| 2 | 1.0 | 3 | 20.14 |
| 1.5 | 1.5 | 0 | (¹) |

¹ Too high for being measured.

EXAMPLE 4

1800 g. of zinc oxide, type Blanc de Zinc Neige A, marketed by Vieille Montagne, Belgium, were dispersed by means of a speed mixer in 2000 ccs. of water, 90 ccs. of a 10% aqueous alkaline (pH 8) solution of copoly-(vinyl methylether/maleic anhydride) (50:50) marketed by General Aniline, U.S.A., under the trade name Gantrez AN 119 as a dispersing agent, and 180 g. of poly-(vinyl acetate/crotonic acid) (94.4/5.6) as binding agent, dissolved in 1500 ccs. of water and 90 ccs. of concentrated ammonium hydroxide of technical grade. To the resulting mixture were added 123.3 g. of a 73% aqueous solution of a melamine resin marketed by British Resin Products under the trade name "Epok W–9801," 73.8 ccs. of acid butyl phosphate as a 10% solution in ethanol, 90 ccs. of a 1% aqueous solution of the sensitizing Chrome Azurol S dyestuff (C.I. 43,825) and 14 ccs. of the iron (III) complex of 1,2-diamino-5,7-disulphonaphthalene as a 0.5% solution in a 50/50 mixture of water and ethanol. The dispersion was coated onto a glassine type paper in a ratio of about 20 g. of zinc oxide per sq. m. The resulting sensitivity amounted to 21 steps by treating the material and determining the results under the same circumstances as described in Example 1. The colouration of the layer is extremely low.

EXAMPLE 5

To 10 g. of each of the photoconductive pigments listed in Table 5 hereinafter were added 100 ccs. of water and 0.5 cc. of a 10% ammoniacal aqueous solution (pH 7) of the copolymer indicated with number 6 in Table 1. The resulting dispersions were mixed for 1 minute with a "Kothoff mixing sirene" whereafter the stability of the dispersion was followed over a period of 24 hours; the Table 5 hereinafter lists the results.

TABLE 5

| Pigment: | Stability |
|---|---|
| CdS | Excellent. |
| ZnO | Do. |
| ZnS | Do. |

We claim:

1. A recording material containing an electrically conductive support carrying a coating comprising:
   (1) a finely divided inorganic pigmentary material, having photoconductive properties and selected from basic or amphoteric oxides and metal sulphides derived from metals forming basic or amphoteric oxides,
   (2) a normally electrically insulating alkali-soluble binder in an amount sufficient to bind said pigment to said support, and
   (3) a water-soluble dispersing agent differing in chemical structure from the binder present in said coating in a ratio of about 0.1 to 1.5% by weight of pigmentary material, said dispersing agent being selected from the group of copolymers having a part of the recurring units thereof derived from a polymerizable unsaturated mono-carboxylic acid, its anhydride or a salt thereof, and another part of said recurring units derived from a polymerizable unsaturated compound containing an amino group, a carbalkoxy group, a carbamyl group, a N-pyrrolidone group or an ether group, and copolymers having a part of the recurring units thereof derived from a polymerizable unsaturated dicarboxylic acid, its anhydride or salt thereof, and another part of said recurring units derived from a polymerizable unsaturated compound containing an ester group, an amino group, a carbalkoxy group, a carbamyl group, a pyrolidone group or an ether group, said pigment material constituting about 60–95% by weight of the solids content of the dried coating.

2. The material of claim 1, wherein the pigmentary material is photoconductive zinc oxide.

3. The material of claim 2, wherein the ratio of the recurring units derived from said unsaturated acid, its anhydride or salt thereof to the recurring units derived from said other unsaturated compound is in the range of 1:5–7:3 on a molar basis.

4. The recording material of claim 1, wherein said copolymers have recurring units derived from a polymerizable unsaturated compound containing an amino group or a carbamyl group.

References Cited
UNITED STATES PATENTS

| 3,471,625 | 10/1969 | Adams et al. | 96—1.5 X |
| 3,489,559 | 1/1970 | Clark et al. | 96—1.8 X |
| 2,804,436 | 8 1957 | Ritson | 260—78.5 X |
| 3,413,255 | 11/1968 | Gardon et al. | 260—78.5 X |
| 3,595,647 | 7/1971 | Yasumori et al. | 96—1.5 |

CHARLES E. VAN HORN, Primary Examiner

R. E. MARTIN, Jr., Assistant Examiner

U.S. Cl. X.R.

96—1.8; 117—161 UF, 161 UC, 218; 260—78.5 BB, 78.5 E, 78.5 R, 80.3 E, 80.3 N, 88.3, 89.7, 91.1 M

UNITED STATES PATENT OFFICE
CERTIFICATE OF CORRECTION

Patent No. 3,708,290                Dated January 2, 1973

Inventor(s) Karel Eugeen VERHILLE et al

It is certified that error appears in the above-identified patent and that said Letters Patent are hereby corrected as shown below:

In the Heading of the Patent, insert --

Assignors to Agfa-Gevaert N.V., Mortsel, Belgium --.

Column 8, Claim 1, line 41, change "pyrolidone" to

-- N-pyrrolidone --.

Signed and sealed this 3rd day of July 1973.

(SEAL)
Attest:

EDWARD M. FLETCHER, JR.           Rene Tegtmeyer
Attesting Officer                 Acting Commissioner of Patents